United States Patent
Soundararajan

(10) Patent No.: US 7,453,866 B2
(45) Date of Patent: Nov. 18, 2008

(54) METHOD AND APPARATUS FOR A DUAL MODE TELEPHONE

(75) Inventor: Aravind Soundararajan, Chennai (IN)

(73) Assignee: NXP B.V., Eindhoven (NL)

( * ) Notice: Subject to any disclaimer, the term of this patent is extended or adjusted under 35 U.S.C. 154(b) by 550 days.

(21) Appl. No.: 10/536,646

(22) PCT Filed: Nov. 26, 2003

(86) PCT No.: PCT/IB03/05456

§ 371 (c)(1),
(2), (4) Date: May 27, 2005

(87) PCT Pub. No.: WO2004/051969

PCT Pub. Date: Jun. 17, 2004

(65) Prior Publication Data

US 2006/0092914 A1    May 4, 2006

Related U.S. Application Data

(60) Provisional application No. 60/430,918, filed on Dec. 4, 2002.

(51) Int. Cl.
*H04L 12/66* (2006.01)

(52) U.S. Cl. ......................................... 370/352; 370/353

(58) Field of Classification Search ................... 370/352
See application file for complete search history.

(56) References Cited

U.S. PATENT DOCUMENTS

| | | | |
|---|---|---|---|
| 6,169,734 B1 | 1/2001 | Wilson | |
| 6,404,764 B1 | 6/2002 | Jones et al. | |
| 6,876,648 B1 * | 4/2005 | Lee | 370/353 |
| 2001/0012282 A1 * | 8/2001 | Yegoshin | 370/338 |
| 2001/0046237 A1 | 11/2001 | Chan et al. | |
| 2002/0089975 A1 | 7/2002 | Vaziri et al. | |
| 2002/0105946 A1 | 8/2002 | Takeuchi | |
| 2003/0036392 A1 * | 2/2003 | Yukie | 455/461 |

FOREIGN PATENT DOCUMENTS

| | | |
|---|---|---|
| GB | 2366687 | 3/2002 |
| WO | WO0120890 | 3/2001 |

* cited by examiner

*Primary Examiner*—Creighton H Smith

(57) ABSTRACT

An apparatus and structure for transmitting and receiving an audio signal over a network (25). A dual mode telephone (1) is adapted to switch between a standard telephone mode and an Internet Protocol (IP) telephone mode. The standard telephone mode comprises a standard telephone (11) adapted to transmit and receive audio over a standard telephone network (37). The IP telephone mode comprises an IP telephone (15) adapted to convert an audio signal to an IP packet and transmit the IP packet over a communication link (14) to a network (25).

22 Claims, 3 Drawing Sheets ial assistant (PDA), etc. The computing device 8 may comprise software to run an electronic mail (e-mail) system or an instant messenger system. Therefore the dual mode telephone 1 may transmit or receive voice and/or text (e.g., e-mail or instant messenger text) to and from the computing device 8.

METHOD AND APPARATUS FOR A DUAL MODE TELEPHONE

CROSS REFERENCE TO RELATED CASES

Applicant claims the benefit of Provisional Application Ser. No. 60/430,918, filed Dec. 4, 2002.

The present invention relates to an apparatus and associated method to transmit and receive an audio signal over a computer network.

Transmitting and receiving an audio signal over a computer network typically requires the use of a computer system. A computer system may be costly and cumbersome. Thus there is a need for an apparatus and associated method to transmit and receive an audio signal over a computer network without the use of a computer system.

The present invention provides a dual mode telephone, comprising:

a telephone adapted to switch between a standard telephone mode and an Internet Protocol (IP) telephone mode, wherein the standard telephone mode comprises a standard telephone adapted to transmit and receive an audio signal over a standard telephone network, and wherein the IP telephone mode comprises an IP telephone adapted to convert the audio signal to an IP packet and transmit the IP packet over a communication link to a network.

The present invention provides, a method comprising:

providing a dual mode telephone comprising a standard telephone mode and an Internet Protocol (IP) telephone mode;

switching the dual mode telephone to the IP telephone mode;

converting, by the IP telephone mode, an audio signal to an IP packet; and transmitting the IP packet over a communication link to a network.

The present invention provides, a method comprising:

providing a dual mode telephone comprising a standard telephone mode and an Internet Protocol (IP) telephone mode;

switching the dual mode telephone to the standard telephone mode; and transmitting and receiving in the standard telephone mode, an audio signal over a standard telephone network.

Figure 1:
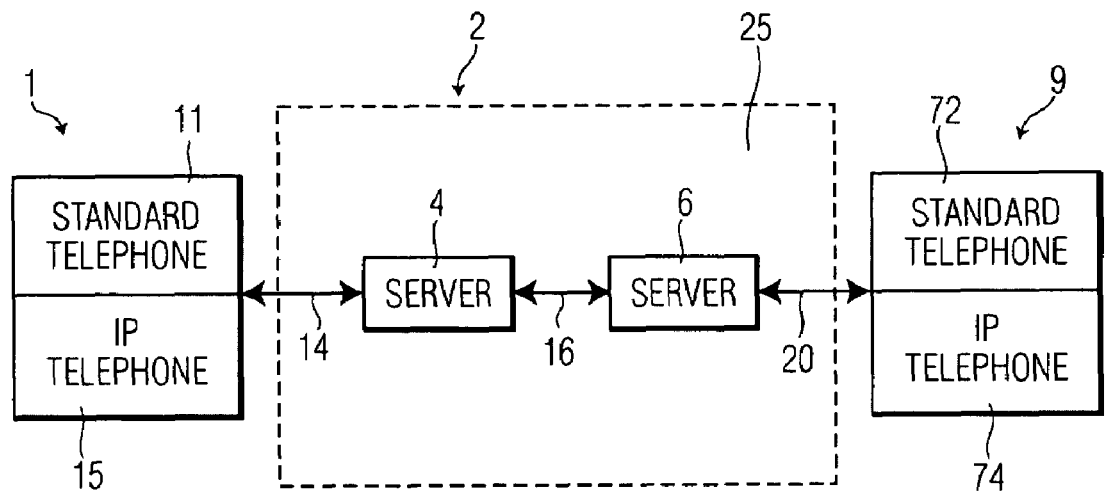
FIG. 1 depicts a block diagram view of a system with a dual mode telephone in Internet protocol (IP) mode in communication with a second dual mode telephone, in accordance with embodiments of the present invention.

FIG. 1 depicts a block diagram view of a system 2 comprising a dual mode telephone 1 in communication with a second dual mode telephone 9, in accordance with embodiments of the present invention. The dual mode telephone 1 comprises a standard telephone mode and an Internet protocol (IP) telephone mode. The standard telephone mode comprises a standard telephone 11 within the dual mode telephone 1. The standard telephone 11 may be any telephone known to a person of ordinary skill in the art and may include, inter alia, a corded telephone, a cordless telephone, a cellular telephone, etc. The standard telephone 11 may transmit and receive audio over any standard telephone network 37 (see FIG. 4) known to a person of ordinary skill in the art. The IP telephone mode comprises an IP telephone 15 within the dual mode telephone 1. The IP telephone 15 converts an audio signal to an IP packet and transmits the IP packet over a communication link 14 to a network 25. The term "IP packet" refers to herein one or more IP packets and may comprise audio and/or text. Additionally, the IP telephone 15 may digitize and compress the audio signal before converting it to the IP packet. The audio signal may be compressed by any compression technique known to a person of ordinary skill in the art. The audio signal may be digitized at any rate such as about 8000 times/ sec or about once every 125 Us @ 4 or 8 bits/sample. The network 25 may be, inter alia, a Transmission Control Protocol (TCP)/IP network, a local area network (LAN), a wide area network (WAN), an Asynchronous transfer mode (ATM) network, etc. Additionally, the IP telephone 15 may receive a second IP packet comprising audio or a text message from the network 25 and convert the second IP packet to a second audio signal. The IP telephone 15 may additionally comprise a monitor to receive the text message in text form from a computing device (e.g., computing device 8 in FIG. 2). The monitor may be any monitor known to a person of ordinary skill in the art such as, inter alia, a liquid crystal display (LCD) monitor, a cathode ray tube (CRT) monitor, etc. The IP telephone 15 may comprise a TCP/IP stack.

The network 25 may comprise a server 4, a server 6, and communication links 14, 16, and 20. The server 4 may be associated with an Internet Service Provider (ISP). The server 6 may be associated with a second ISP. Alternatively, the network 4 may comprise only one server associated with one ISP. The communication links 14, 16, and 20 may be a solid medium link such as, inter alia, fiber-optic cable, twisted pair copper wire, coaxial cable, etc. Alternatively, the communication links 14, 16, and 20 may be a wireless medium link such as, inter alia, satellite, cellular, etc. The dual mode telephone 1 is adapted to input a telephone number for connection to a server. Additionally, the dual mode telephone 1 is adapted to directly input an IP address of a remote device for communication (e.g., a duel mode telephone 9). The dual mode telephone 1 may be switched between the standard telephone 11 and the IP telephone 15 at any time. The switching may be done manually using hardware. Alternatively, the switching may be done automatically using a handshaking process (e.g., see FIG. 5, step 28). The dual mode telephone 1 may communicate with a second dual mode telephone 9. The second dual mode telephone 9 comprising a standard telephone 72 and an IP telephone 74 is equivalent to the dual mode telephone 1 comprising the standard telephone 11 and an IP telephone 15.

Figure 2:
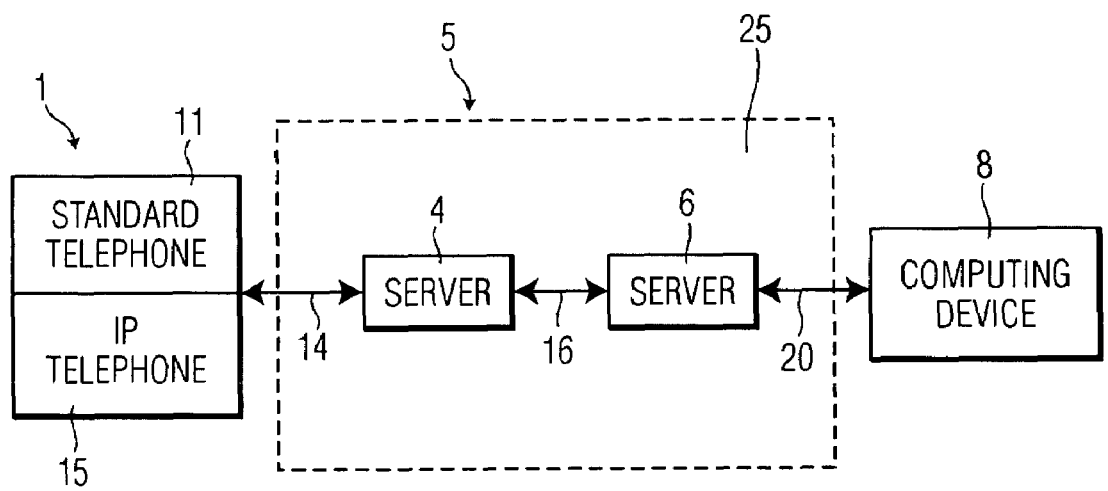
FIG. 2 illustrates a variation of FIG. 1 depicting a block diagram view of a system with the dual mode telephone in IP mode in communication with a computing device, in accordance with embodiments of the present invention.

FIG. 2 illustrates a variation of FIG. 1 depicting a block diagram view of a system 5 with the dual mode telephone 1, in accordance with embodiments of the present invention. In contrast with FIG. 1, the dual mode telephone 1 is in communication with a computing device 8. The computing device 8 may be any computing device known to a person of ordinary skill in the art such as, inter alia, a computer, a personal computer (PC), a portable web browser, a personal digital assistant (PDA), etc. The computing device 8 may convert an audio signal to an IP packet for transmission over the network 25. Alternatively, the computing device 8 may use messaging (e.g., instant messaging, text messaging, etc.) to convert text to an IP packet for communication with the dual mode telephone 1.

Figure 3:
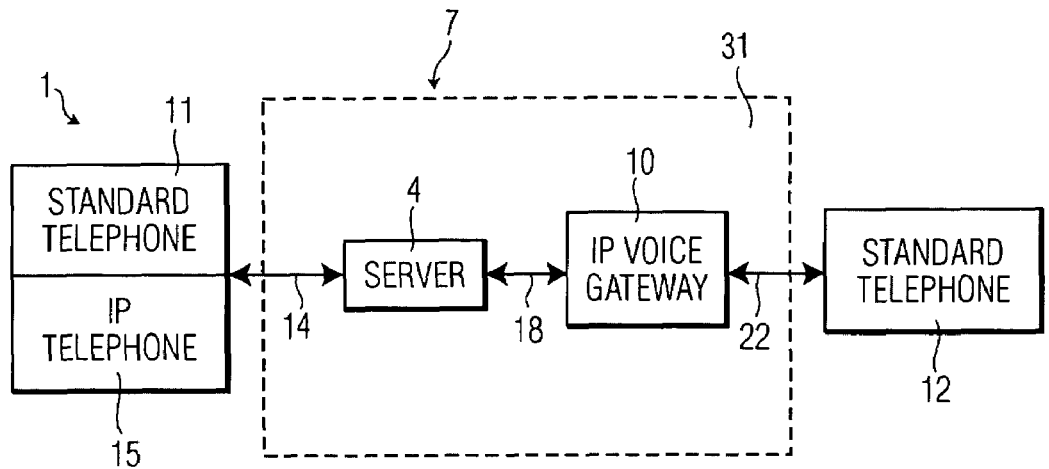
FIG. 3 depicts a block diagram view of a system with a dual mode telephone in IP mode in communication with a standard telephone, in accordance with embodiments of the present invention.

FIG. 3 illustrates a second variation of FIG. 1 depicting a block diagram view of a system 7 with the dual mode telephone 1 in IP mode in communication with a network 31, in accordance with embodiments of the present invention. In contrast with FIG. 1, the dual mode telephone 1 in IP mode is in communication with a standard telephone 12. The standard telephone 11 may be any telephone known to a person of ordinary skill in the art and may include, inter alia, a corded telephone, a cordless telephone, a cellular telephone, etc. In addition to the server 4 and the communication links 14 and 18, the network 31 comprises an IP voice gateway 10 and a communication link 55. The IP voice gateway 10 converts an IP packet to an audio signal for transmission over the communication link 55 to the standard telephone 12. The communication link 55 may be any standard telephone line known to a person of ordinary skill in the art.

Figure 4:
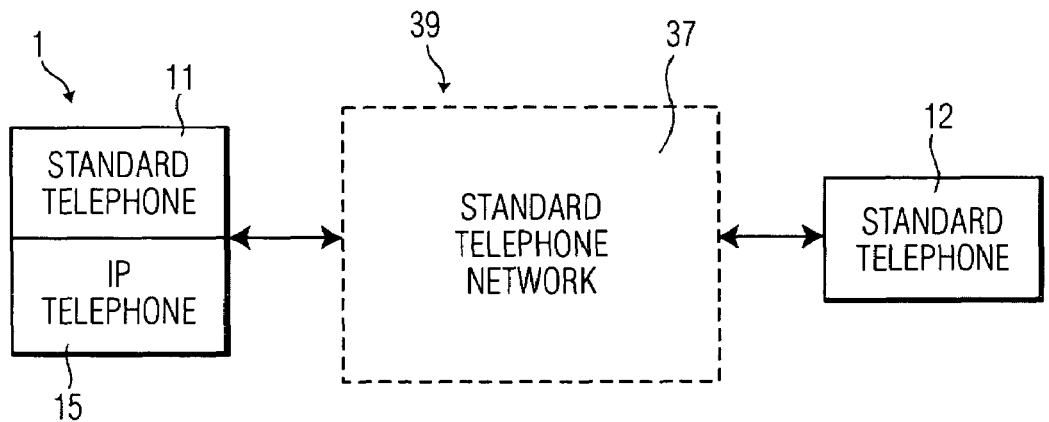
FIG. 4 depicts a block diagram view of a system with a dual mode telephone in standard telephone mode in communication with a standard telephone, in accordance with embodiments of the present invention.

FIG. 4 illustrates a variation of FIG. 3 depicting a block diagram view of a system with the dual mode telephone 1 in communication with the standard telephone 12, in accordance with embodiments of the present invention. In contrast with FIG. 3, the dual mode telephone 1 is in a standard telephone mode comprising a standard telephone 11. Additionally, the dual mode telephone is communicating (transmitting and receiving audio) with the standard telephone 12 of FIG. 3 over a standard telephone network 37. The standard telephone network 37 may be any standard telephone network known to a person of ordinary skill in the art. The IP telephone 15 is not used with the standard telephone 12.

Figure 5:
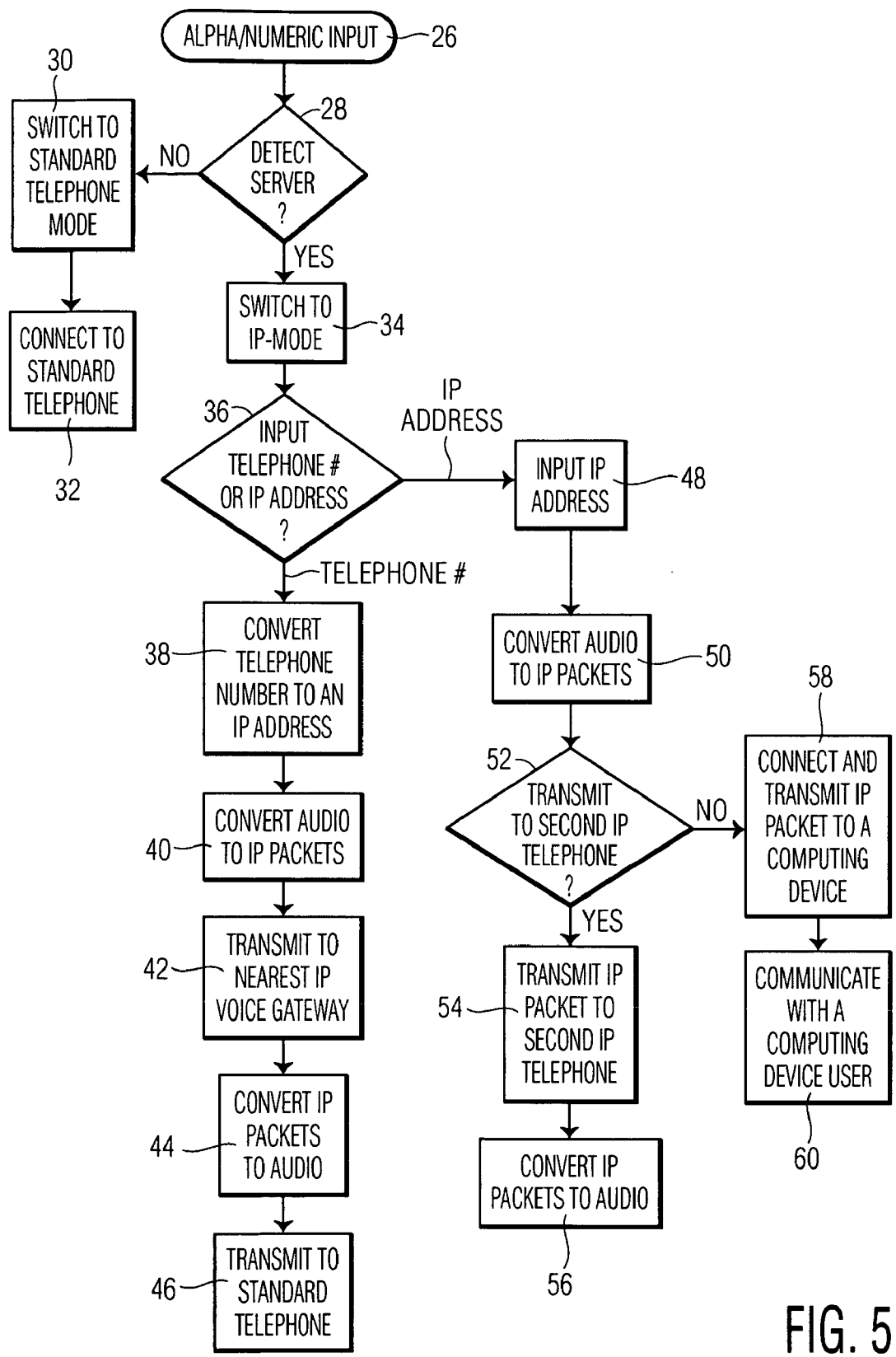
FIG. 5 illustrates a flowchart depicting an algorithm of a communication process, in accordance with embodiments of the present invention.

FIG. 5 illustrates a flowchart depicting an algorithm of a communication and switching process used in FIGS. 1-4 for the dual mode telephone 1 to communicate with various devices, in accordance with embodiments of the present invention. Step 26 represents a alpha/numeric user input to the IP telephone 1. The alpha/numeric user input may be a telephone number to an Internet service provider (ISP) or a telephone number to a server (e.g., the server 4 in FIG. 1). Alternatively, the alpha/numeric user input may be an IP address of a device (e.g., the dual mode telephone 9 in FIG. 1, the computing device 8 in FIG. 2, etc.) and the process may start at step 48. In step 28 a handshaking process takes place. If in step 28 the dual mode telephone 1 detects the standard telephone network 37 (see FIG. 4), the dual mode IP telephone 1 is switched to the standard telephone mode in step 30. In step 32 the IP telephone 1 is connected to the standard telephone 12 in FIG. 4.

If in step 28 an Internet service provider (ISP) or server is detected by the dual mode telephone 1, the dual mode telephone 1 is switched to IP telephone mode in step 34. After step 34, a user may input a telephone number in step 36 to an intended party or an IP address to an intended party in step 48 to the dual mode telephone 1. If the user inputs the telephone number in step 36, the telephone number is converted to an IP address to the IP voice gateway 10 (see FIG. 3) in step 38. In step 40, an audio signal (e.g., the user's voice) is converted to an IP packet and in step 42 the IP packet is transmitted to the IP voice gateway 10 of FIG. 3. In step 44, the IP voice gateway 10 converts the IP packet to an audio signal. In step 46, the IP voice gateway 10 transmits the audio signal to the standard telephone 12 of FIG. 3. If the user inputs the IP address in step 48, then the dual mode telephone will convert an audio signal to an IP packet in step 50. In step 52, a second handshaking process may take place. If in step 52 a second IP telephone 9 (see FIG. 1) is detected then the IP packet is transmitted to the second IP telephone 9 in step 54.

In step 56, the IP packet is converted back to an audio signal. If in step 52 a computing device 8 (see FIG. 2) is detected then the IP packet is transmitted to the computing device in step 58. In step 60, a communication process takes place with a computing device user as discussed supra in the description of FIG. 2.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A dual mode telephone, comprising:
   a telephone adapted to switch between a standard telephone mode and an Internet Protocol (IP) telephone mode, the telephone operating in the standard telephone mode as a standard telephone that is adapted to transmit and receive an audio signal over a standard telephone network, and the telephone operating in the IP telephone mode as an IP telephone that is adapted to convert the audio signal to an IP packet and transmit the IP packet over a network, the telephone further adapted to:
   in response to detecting the standard telephone network, switch to the standard telephone mode and transmit the audio signal over the standard telephone network;
   in response to detecting the network, switch to the IP telephone mode;
   in response to a telephone number being inputted while the telephone is operating in the IP telephone mode, convert the telephone number to an IP address, convert the audio signal to the IP packet and transmit the IP packet over the network to a second standard telephone; and
   in response to an IP address being inputted while the telephone is operating in the IP telephone mode, convert the audio signal to the IP packet and transmit the IP packet over the network, wherein the telephone determines whether the IP packet is transmitted over the network to one of a second dual mode telephone and a computing device.

2. The dual mode telephone of claim 1, wherein the IP telephone is adapted to receive a second IP packet from the network and convert the second IP packet to a second audio signal.

3. The dual mode telephone of claim 2, wherein the second dual mode telephone includes a second IP telephone that is adapted to receive the IP packet and convert the IP packet to the audio signal, and wherein the second IP telephone is adapted to convert the second audio signal to the second IP packet and transmit the second IP packet over the network.

4. The dual mode telephone of claim 2, wherein the telephone is adapted to transmit the IP packet over the network to the computing device, and wherein the telephone is adapted to receive the second IP packet from the computing device.

5. The dual mode telephone of claim 4, wherein the computing device is selected from the group consisting of a computer, a portable web browser, and a personal digital assistant (PDA).

6. The dual mode telephone of claim 1, wherein the network includes an IP voice gateway that is adapted to convert the IP packet to the audio signal and transmit the audio signal to the second standard telephone.

7. The dual mode telephone of claim 1, wherein the network includes a wireless communication link.

8. The dual mode telephone of claim 1, wherein the IP telephone is adapted to accept an alpha/numeric input.

9. The dual mode telephone of claim 8, wherein the alpha/numeric input is an IP address.

10. The dual mode telephone of claim 8, wherein the alpha/numeric input is a telephone number.

11. The dual mode telephone of claim 1, wherein the IP telephone comprises a Transmission Control Protocol (TCP)/IP stack.

12. The dual mode telephone of claim 1, wherein the switching between the standard telephone mode and the Internet Protocol telephone mode is determined by a handshaking process.

13. A method comprising:
   providing a dual mode telephone that operates in a standard telephone mode and in an Internet Protocol (IP) telephone mode;
   in response to detecting a standard telephone network, operating the dual mode telephone as a standard telephone in the standard telephone mode and transmitting an audio signal over the standard telephone network;
   in response to detecting a network, operating the dual mode telephone as an IP telephone in the IP telephone mode;
   in response to a telephone number being inputted while the dual mode telephone is operating in the IP telephone mode, converting the telephone number to an IP address, converting, the audio signal to an IP packet and transmitting the IP packet over the network to a second standard telephone; and
   in response to an IP address being inputted while the dual mode telephone is operating in the IP telephone mode, converting the audio signal to the IP packet and transmitting the IP packet over the network, wherein the dual mode telephone determines whether the IP packet is transmitted over the network to one of a second dual mode telephone and a computing device.

14. The method of claim 13, further comprising receiving by the dual mode telephone a second IP packet from the network and converting the second IP packet to a second audio signal.

15. The method of claim 13, wherein the IP packet is received by the second dual mode telephone from the network and converted by the second dual mode telephone to the audio signal.

16. The method of claim 15, wherein a second audio signal is converted by the second dual mode telephone to a second IP packet, and wherein the second IP packet is transmitted to the network.

17. The method of claim 16, further comprising receiving by the dual mode telephone the second IP packet from the network and converting the second IP packet to the second audio signal.

18. The method of claim 13, wherein the network includes an IP voice gateway that converts the IP packet to the audio signal and that transmits the audio signal to the second standard telephone.

19. The method of claim 14, wherein the IP packet is transmitted over the network to the computing device.

20. The method of claim 19, further comprising receiving by the dual mode telephone the second IP packet from the computing device.

21. The method of claim 19, wherein the computing device is selected from the group consisting of a computer, a portable web browser, and a personal digital assistant (PDA).

22. The method of claim 13, wherein a handshaking process is used to determine whether the dual mode telephone operates in the standard telephone mode or in the IP telephone mode, and a second handshaking process is used by the dual mode telephone to determine whether the IP packet is transmitted over the network to the second dual mode telephone or to the computing device.

* * * * *